(12) United States Patent
Lokken (10) Patent No.: US 7,243,099 B2
(45) Date of Patent: Jul. 10, 2007

(54) COMPUTER-IMPLEMENTED METHOD, SYSTEM, APPARATUS FOR GENERATING USER'S INSIGHT SELECTION BY SHOWING AN INDICATION OF POPULARITY, DISPLAYING ONE OR MORE MATERIALIZED INSIGHT ASSOCIATED WITH SPECIFIED ITEM CLASS WITHIN THE DATABASE THAT POTENTIALLY MATCH THE SEARCH

(75) Inventor: Robert C. Lokken, Boise, ID (US)

(73) Assignee: ProClarity Corporation, Boise, ID (US)

( * ) Notice: Subject to any disclaimer, the term of this patent is extended or adjusted under 35 U.S.C. 154(b) by 164 days.

(21) Appl. No.: 10/744,270

(22) Filed: Dec. 23, 2003

(65) Prior Publication Data

US 2005/0138043 A1 Jun. 23, 2005

(51) Int. Cl.
 G06F 17/30 (2006.01)
 G06F 17/00 (2006.01)
 G06N 5/00 (2006.01)
(52) U.S. Cl. .............................. 707/5; 707/3; 707/102; 707/200; 706/45; 715/968
(58) Field of Classification Search ................ 707/1–6, 707/10, 100, 102–103 R, 200; 715/501.1, 715/513, 526, 968; 705/1–3, 10, 26–27, 705/14, 80; 706/45–50, 21
See application file for complete search history.

(56) References Cited

U.S. PATENT DOCUMENTS 5,414,838 A * 5/1995 Kolton et al. ............. 705/36 R
5,802,518 A * 9/1998 Karaev et al. ................. 707/9
5,978,804 A * 11/1999 Dietzman ..................... 707/10

(Continued)

FOREIGN PATENT DOCUMENTS

EP 1345130 * 9/2003 ..................... 17/30

(Continued)

OTHER PUBLICATIONS

Michael Spenke, , "FOCUS: The interactive table for product comparision and selection",proceedings of the 9th annual ACM symposium on User interface softwae and technology, 1996, pp. 41-50.*

(Continued)

*Primary Examiner*—Srirama Channavajjala
(74) *Attorney, Agent, or Firm*—Merchant & Gould (57) ABSTRACT

A database access component provides access to a database comprising a plurality of searchable items, one or more of the items being registered with one or more item classes, each item class being associated with at least one insight pertaining to items registered to that item class. An item matching component receives a user-specified search term and item class. In response, the item matching component lists one or more items of the specified item class within the database having names that potentially match the search term. An insight selection component automatically reveals one or more insights associated with the specified item class, after which the insight selection component receives a user selection of a listed item and one or more of the revealed insights. An insight materialization component then materializes the one or more selected insights using the selected item.

35 Claims, 8 Drawing Sheets

U.S. PATENT DOCUMENTS

| | | | |
|---|---|---|---|
| 6,078,924 A * | 6/2000 | Ainsbury et al. | 707/101 |
| 6,094,651 A * | 7/2000 | Agrawal et al. | 707/5 |
| 6,496,814 B1 * | 12/2002 | Busche | 706/21 |
| 6,606,744 B1 * | 8/2003 | Mikurak | 717/174 |
| 6,615,258 B1 * | 9/2003 | Barry et al. | 709/223 |
| 6,697,799 B1 * | 2/2004 | Neal et al. | 707/3 |
| 6,721,748 B1 * | 4/2004 | Knight et al. | 707/10 |
| 6,900,807 B1 * | 5/2005 | Liongosari et al. | 345/440 |
| 6,983,187 B2 * | 1/2006 | Kern | 700/97 |
| 2001/0047353 A1 * | 11/2001 | Talib et al. | 707/3 |
| 2002/0046157 A1 * | 4/2002 | Solomon | 705/37 |
| 2002/0077930 A1 * | 6/2002 | Trubey et al. | 705/26 |
| 2002/0133368 A1 * | 9/2002 | Strutt et al. | 705/1 |
| 2002/0156685 A1 * | 10/2002 | Ehrlich et al. | 705/26 |
| 2002/0178223 A1 * | 11/2002 | Bushkin | 709/205 |
| 2002/0198791 A1 * | 12/2002 | Perkowski | 705/26 |
| 2003/0028451 A1 * | 2/2003 | Ananian | 705/27 |
| 2003/0055819 A1 * | 3/2003 | Saito et al. | 707/3 |
| 2003/0074391 A1 * | 4/2003 | Carter et al. | 709/200 |
| 2003/0083961 A1 * | 5/2003 | Bezos et al. | 705/27 |
| 2003/0130983 A1 * | 7/2003 | Rebane | 707/1 |
| 2003/0195877 A1 * | 10/2003 | Ford et al. | 707/3 |
| 2003/0204447 A1 * | 10/2003 | Dalzell et al. | 705/26 |
| 2003/0217052 A1 * | 11/2003 | Rubenczyk et al. | 707/3 |
| 2004/0243593 A1 * | 12/2004 | Stolte et al. | 707/100 |
| 2004/0243607 A1 * | 12/2004 | Tummalapalli | 707/100 |
| 2005/0138020 A1 * | 6/2005 | Lokken | 707/3 |
| 2006/0195428 A1 * | 8/2006 | Peckover | 707/3 |

FOREIGN PATENT DOCUMENTS

| | | | | |
|---|---|---|---|---|
| WO | WO 00/62203 | * | 10/2000 | 17/30 |
| WO | WO 01/29746 | * | 4/2001 | 17/60 |
| WO | WO 2004/057491 | * | 7/2004 | 17/30 |
| WO | WO 2004/081827 | * | 9/2004 | 17/60 |
| WO | WO 2004/099901 | * | 11/2004 | |
| WO | WO 2005/065101 | * | 7/2005 | |
| WO | WO 2006/092686 | * | 9/2006 | 17/30 |

OTHER PUBLICATIONS

Josee Loudiadis, "early sales of new technology products: a framework for comparing the sales cycle of competing start-up and large supplier firms", Frontiers in education conference, 2000, Oct. 2000, vol. 2, pp. 348-357.*

Pazzani,M.J "Knowledge discovery from data?", IEEE intelligent systems and their applications, vol. 15, issue:2, 2000, pp. 10-12.*

Askira-Gelman, "knowledge discovery: comprehensibility of the results", proceedings of the thirty-first Hawaii international conference on system sciences, 1998, vol. 5, pp. 247-255.*

Dao-I Lin et al. "pincer-search: an efficient algorithm for discovering the maximum frequentset", Transactions on knowledge and data engineering, vol. 14, No. 3, 2002, pp. 553-566.*

* cited by examiner

COMPUTER-IMPLEMENTED METHOD, SYSTEM, APPARATUS FOR GENERATING USER'S INSIGHT SELECTION BY SHOWING AN INDICATION OF POPULARITY, DISPLAYING ONE OR MORE MATERIALIZED INSIGHT ASSOCIATED WITH SPECIFIED ITEM CLASS WITHIN THE DATABASE THAT POTENTIALLY MATCH THE SEARCH

TECHNICAL FIELD

The present invention relates generally to the field of knowledge management. More specifically, the present invention relates to techniques for revealing insights related to items in a database.

BACKGROUND OF THE INVENTION

Insights, such as customized reports, views, or analyses about particular items (e.g, products, employees) in a database, are powerful tools for business managers. However, conventional approaches to generating and displaying insights are deficient in many respects. For example, creating insights from a static report requires a manager to extract data elements from the report, often manually, and input those elements into an insight generation tool. Such a process is slow, tedious, and requires substantial know-how.

Parameterized reports, while being able to analyze database items to a certain extent, also have drawbacks. For example, the manager must know where the reports are located, what reports are available, and which of several reports is the most appropriate for the manager's intended purpose. Search engines are available, but until a parameterized report is generated by specifying a parameter, it does not yet have any content to enable searching.

Ad hoc tools exist to query a database, extract data elements, and provide any desired type of analysis. However, such tools require precise knowledge about the location and structure of the database and the type of analysis desired. Again, this is a slow and time-consuming process that requires a high degree of expertise.

Ideally, managers should be able to find insights without having to perform the analysis themselves. Likewise, managers should be able to create insights without massive generation of reports or even knowing the location and name of the report. However, no currently available system addresses these concerns.

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to computer-implemented methods, system, and computer program products that are arranged to perform the actions of: registering one or more searchable items in a database with one or more item classes, where each item class is associated with at least one insight pertaining to items registered to that item class; receiving a user-specified search term and item class; listing one or more items of the specified item class within the database having names that potentially match the search term; in response to receiving the item class, automatically revealing one or more insights associated with the specified item class; obtaining a user selection of a listed item and one or more of the revealed insights; and materializing the one or more selected insights using the selected item. Other embodiments may also include the steps of: identifying the item class associated with an item, and automatically revealing one or more insights associated with the specified item class in response to the identification of the item class.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

The present invention solves the aforementioned problems and disadvantages by providing a system and method for automatically discovering insights that allows managers to search for an item of interest and receive a list of related insights that can be generated. Thus, managers do not need to perform manual analysis, nor do they need to know the location and name of reports to obtain insights about particular items in a database.

Reference is now made to the figures in which like reference numerals refer to like elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

Figure 1:
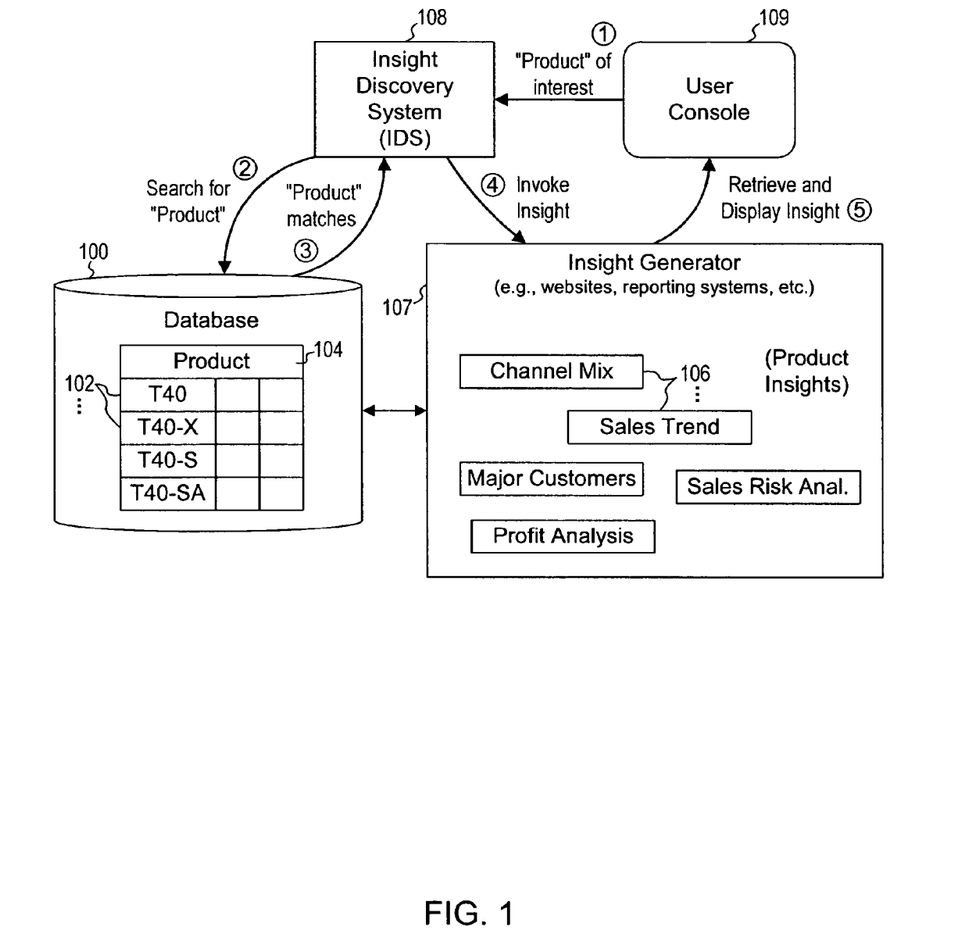
FIG. 1 is a high-level block diagram of a system in accordance with an embodiment of the invention.

Referring to FIG. 1, a database 100 may include a plurality of searchable items 102, such as specific products, employees, vendors, etc. The database 100 may be configured in any suitable manner, e.g., relational, analytical, object-oriented, dimensional. For instance, the database 100 may be embodied as Oracle 10g, IBM DB/2, Microsoft SQL Server, or other commonly-available database 100. While only a single database 100 is depicted, a plurality of databases 100 may be used within the scope of the invention. Hence, references herein to "a database" should be construed to mean "one or more databases."

Various items 102 in the database 100 may be registered to one or more item classes 104 representing groups of related items 102. For example, the depicted embodiment, the items 102 may be different models of laptop computers, which are all registered to an item class 104 called "Product." As illustrated, an item class 104 may be the name of a table containing the items 102.

As further illustrated in FIG. 1, item classes 104 may be associated with one or more insights 106, which are customized reports, views, analyses, etc., pertaining to items 102 registered to that item class 104. Insights 106 may be generated by a insight generator 107, which may be implemented using one or more websites, reporting systems, or the like. In the depicted embodiment, names of available insights 106 include "Channel Mix," "Sales Trend," "Profit Analysis," "Sales Risk Analysis," "Major Customers," etc. Item classes 104 may be associated with the insights 106 using any conventional mechanism, e.g., key fields, links, pointers, or other explicit or implicit references.

In one embodiment, an insight discovery system (IDS) 108 may access the database 100 using standard protocols and techniques. As described more fully below, the IDS 108 and its associated components may be implemented using any suitable combination of hardware, software, or firmware. For example, the IDS 108 may be implemented using software modules executing on a standard PC-compatible workstation or server. Embodiments also include computer program products that comprise computer-readable medium having stored therein program instructions. As is well known in the art, computer-readable media may include RAM, ROM, CD-ROM, floppy disk, optical disk, or any medium suitable for storing computer-readable instructions. Such media may be implemented as part of standard PC-compatible workstations, servers, or other hardware components. Alternatively, the IDS 108 could be implemented using hardware components.

The IDS 108 assists a user in automatically discovering available insights about particular items in the database 100. For instance, a user may specify a product of interest at a user console 109. The IDS 108 searches the database 100 for matching products and displays them to the user. The IDS 108 may also query the database 100 and/or the insight generator 107 for product insights 106. In response to a user selection of a product and an associated insight 106, the IDS 108 invokes the insight 106 and retrieves and displays the same for the user.

Figure 2:
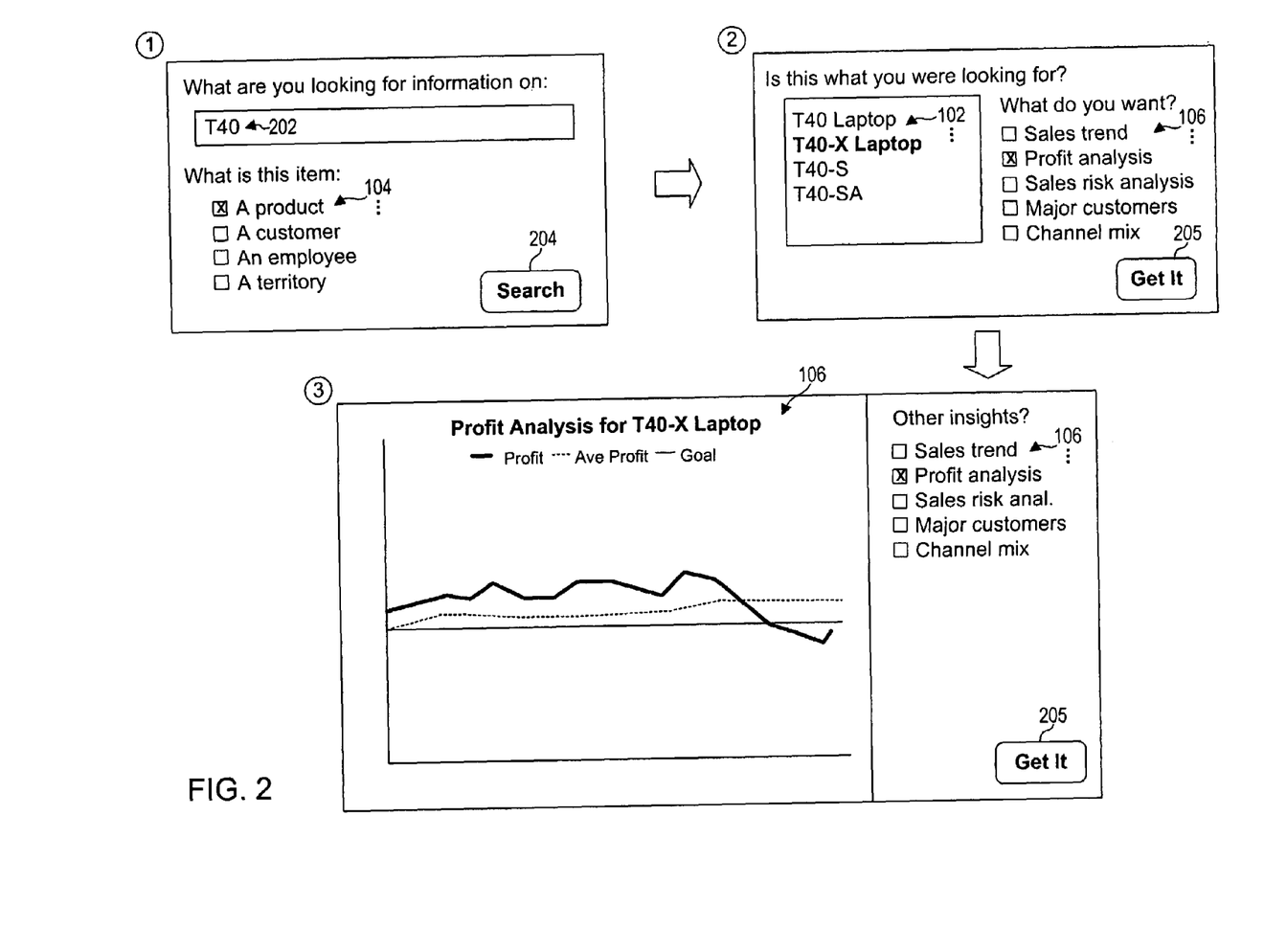
FIG. 2 is a first example of a user session with an insight discovery system.

FIG. 2 illustrates additional details of the above-described process in the context of a user session with an IDS 108. As shown in FIG. 2, the user initially specifies a search term 202, e.g., "T40," comprising a name, description, or other identifier of an item 102 to search for in the database 100. As contemplated herein, a search term 202 may include one or more distinct letters, words, or symbols. In the depicted embodiment, the user also specifies an item class 104, e.g., "product," to narrow the search.

When the user activates a designated "Search" button 204 or the like, the IDS 108 queries the database 100 for items 102 of the specified item class 104 having names that match or possibly match the search term 202. The phrase "possibly match" is used because a user may not know (or not wish to enter) the exact name of a desired item 102. Accordingly, the system may list one or more items 102 having names that include all or part of the search term 202 or comprise synonyms, alternative spellings, or other variations thereof. Hence, the following description uses phrases like "possibly matching" or "potentially matching" to refer to both exact matches and near matches based on various criteria.

In step 2, the IDS 108 displays a list of potentially matching items 102. In addition, the IDS 108 displays a list of one or more insights 106 associated with the selected item class 104. In one embodiment, the user selects the item 102, e.g., "T40-X," that appears to be the closest match. In addition, the user selects a desired insight 106, e.g., "Profit analysis," before activating a "Get It" button 205 or the like.

The IDS 108 then "materializes" the selected insight 106 in step 3 using the selected item 102. As described in greater detail below, the materialization process involves generating a parameterized view, report, analysis, or the like, using the selected item 102 as a parameter. The resulting "materialized" insight 106 is then presented to the user on a display device, e.g., computer monitor.

In certain embodiments, the user may be allowed to selectively view one or more different insights 106 without having to leave the screen (e.g., dialog box, web page, etc.) in which the selected insight 106 is materialized. For example, as shown in FIG. 2, the IDS 108 may display with the materialized insight 106 a list of other insights 106 available to the user. This makes it easy for the user to select a different insight 106 in case the first insight 106 was not the one that was intended.

Figure 3:
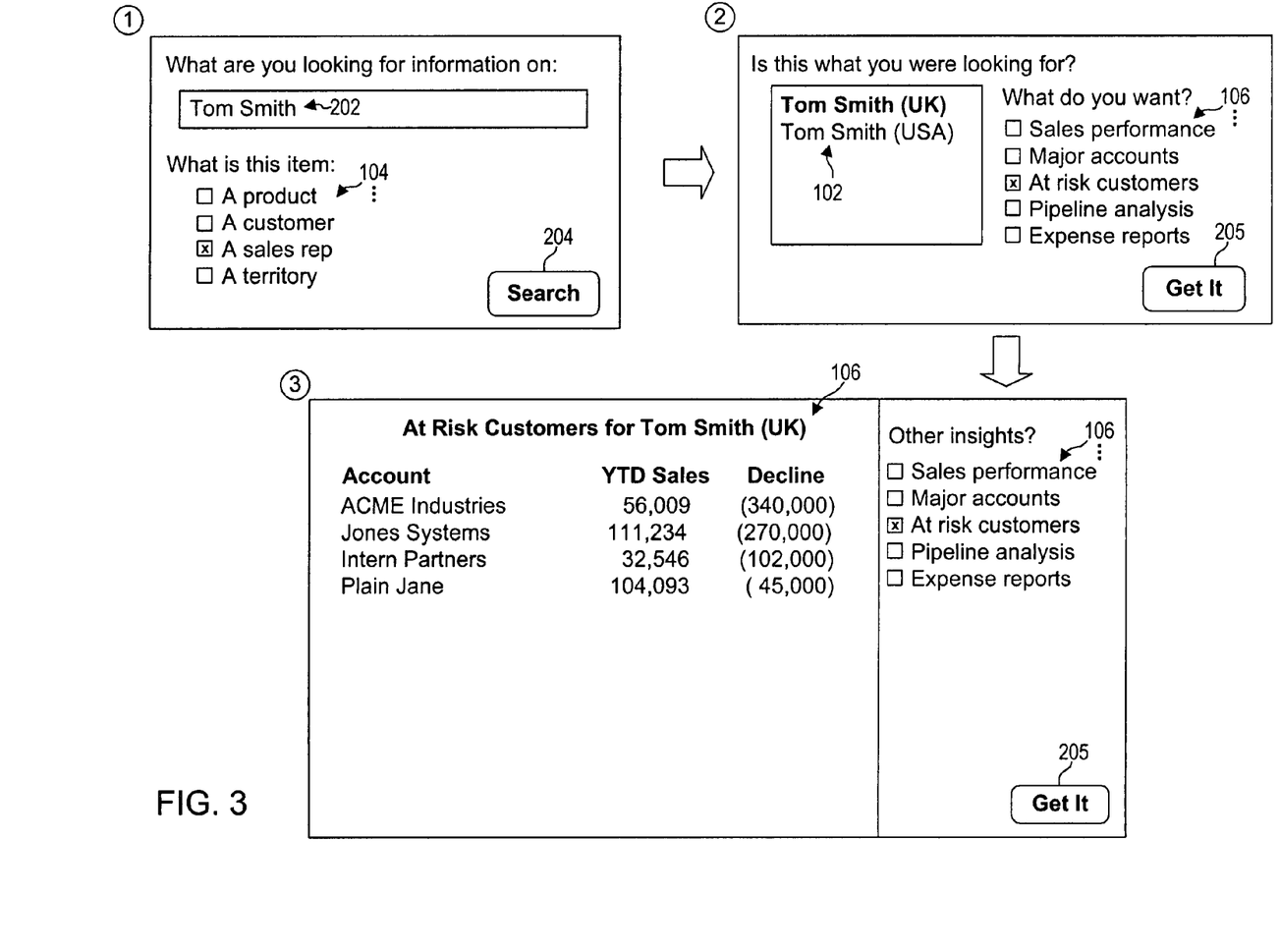
FIG. 3 is a second example of a user session with an insight discovery system.

FIG. 3 presents another example of the above-described process. Initially, the user enters a search term 202, e.g., "Tom Smith," as well as an item class 104, e.g., "sales rep." When the "Search" button 204 is pressed, the IDS 108 displays a list of potentially matching items 102 in the database 100, as well as one or more insights 106 associated with the item class 104.

The user selects the most closely matching item 102, e.g., "Tom Smith (UK)." In addition, the user chooses one of the insights 106, e.g., "At risk customers." After activating the "Get It" button 205, the IDS 108 materializes the selected insight 106, displaying it for the user.

Figure 4:
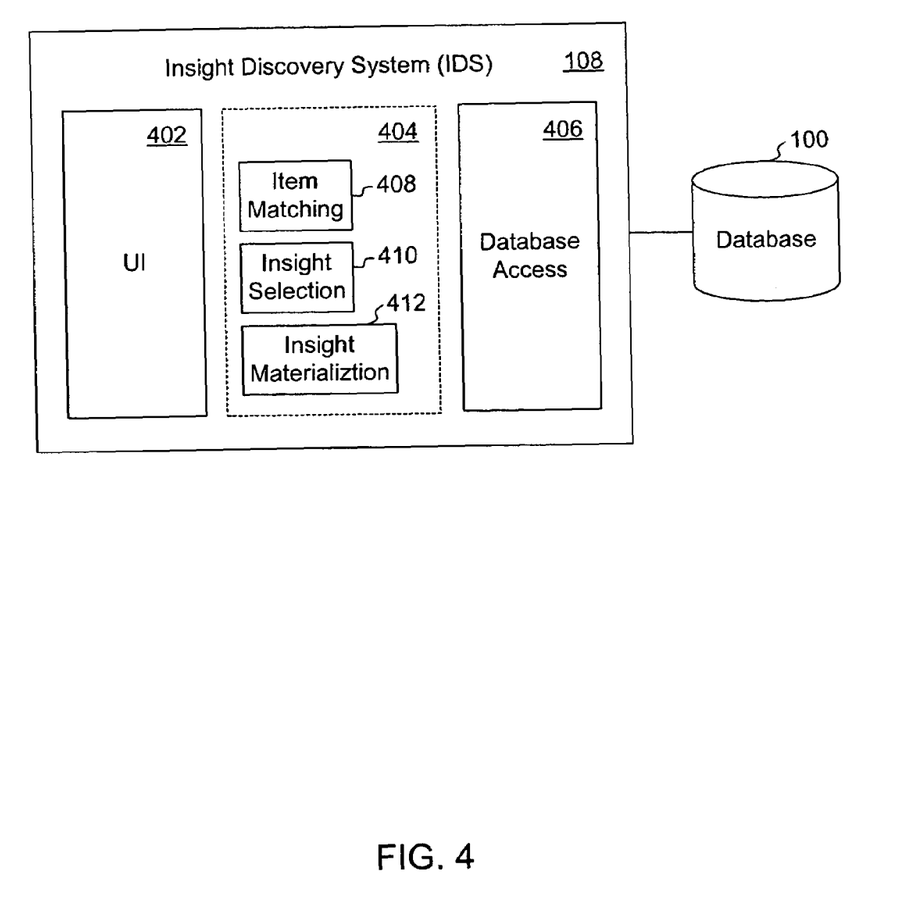
FIG. 4 is a detailed block diagram of an insight discovery system.

FIG. 4 illustrates additional details of an IDS 108 according to an embodiment of the invention. In one implementation, the architecture of the IDS 108 is divided into three layers—a user interface (UI) layer 402, a processing layer 404, and a database access layer 406. In other embodiments, the architecture could be substantially different without departing from the spirit and scope of the invention. For example, various layers may be combined or added.

The UI layer 402 facilitates interaction with the user. For instance, the UI layer 402 is responsible for displaying the dialog boxes of FIGS. 2 and 3. The UI layer 402 is also responsible for collecting user input and providing that input to other modules and layers within the IDS 108.

The database access layer 406 provides an interface with the database 100. The database access layer 406 may implement various access methods and protocols depending on the type and configuration of the database 100. In one embodiment, the database access layer 406 may provide network connectivity where the database 100 is accessed remotely through a network (not shown), such as a LAN or the Internet.

The processing layer 404 may include a number of functional modules or components. For example, the processing layer 404 may include an item matching component 408, an insight selection component 410, and an insight materialization component 412. As previously explained, the above-described components may be implemented using any suitable combination of hardware, software, or firmware. In addition, those of skill in the art will recognize that the functionality of various components may be combined within a single component or split among a number of additional components without departing from the scope of the invention.

In one embodiment, the item matching component 408 receives a user-specified search term 202 and item class 104. The item matching component 408 then queries the database 100 for items 102 of the specified item class 104 having names that potentially match the search term 202 and lists such items 102, in one implementation, as shown in FIGS. 2 and 3.

The insight selection component 410 automatically reveals one or more insights 106 associated with the specified item class 104 after querying the database 100 and/or the insight generator 107. As used herein, "automatically" means that the user is not required to initiate a search for the associated insights 106 as a separate step. Rather, the insights 106 are revealed to the user in response to initiating a search for a desired item 102.

The user is then prompted to select one of the items 102 and a desired insight 106 related to the selected item 102. While the items 102 and associated insights 106 are depicted as being displayed within the same dialog box, the invention is not limited in this respect. For example, the user could be prompted to select the item 102 and associated insight 106 within separate dialog boxes, web pages, or screens. In still other embodiments, the user may select multiple items 102 and/or insights 106 where, for example, a particular insight 106 is desired for multiple items 102 or multiple insights 106 are desired for a specific item 102.

The insight materializing component 412 uses the selected item 102 to materialize the selected insight 106. As noted above, the materialization process involves generating a parameterized view, report, analysis, or the like, using the selected item 102 as a parameter. The resulting "materialized" insight 106 is then displayed to the user.

Figure 5:
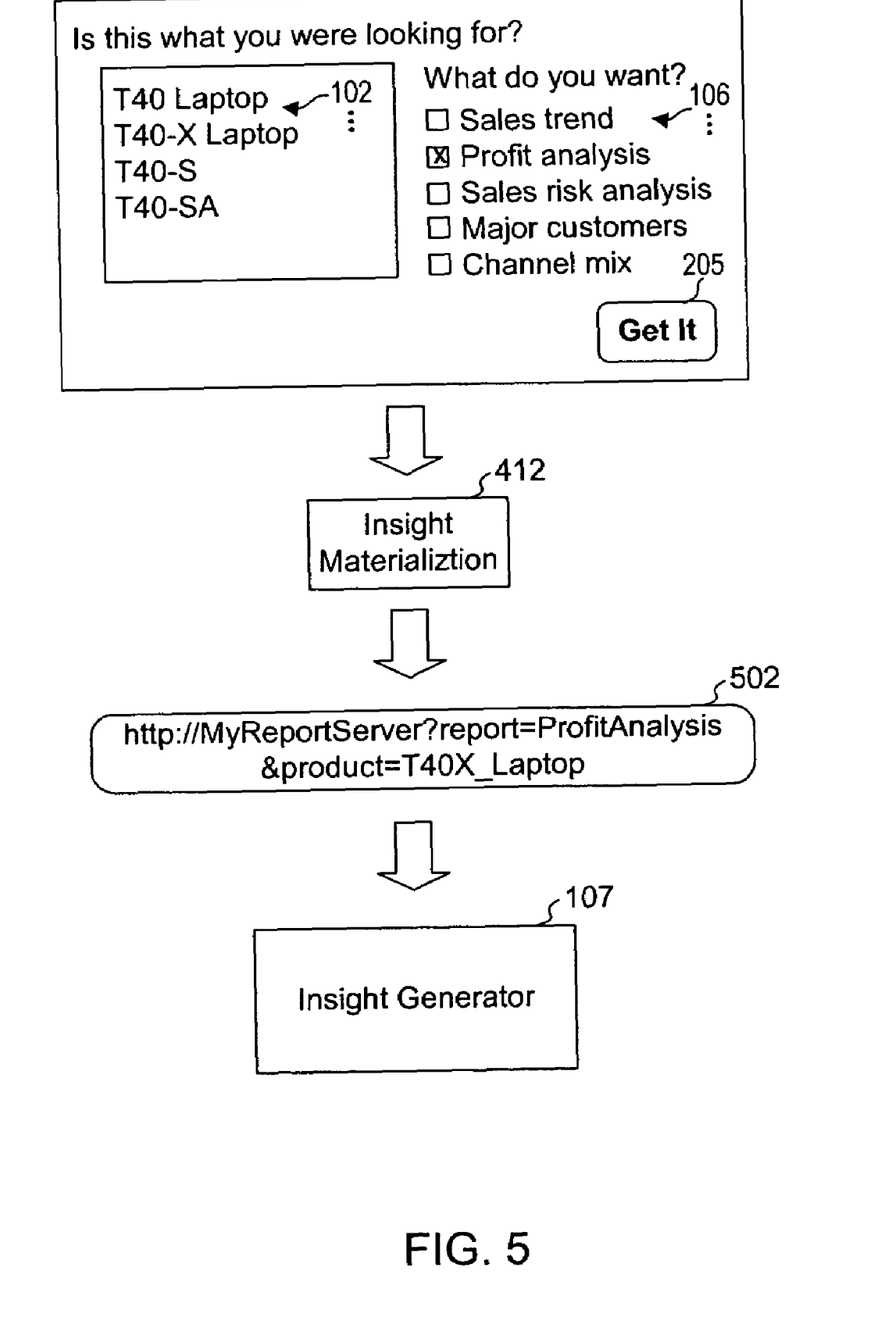
FIG. 5 is a data flow diagram showing the operation of an insight materialization component.

As shown in FIG. 5, the insight 106 is generated or retrieved, in one embodiment, by constructing a parameterized uniform resource locator (URL) 502. Continuing with the example of FIG. 2, the user may select an item 102, e.g., "T40-X Laptop," and an insight 106, e.g., "Profit analysis." Accordingly, the insight materializing component 412 may construct a parameterized URL 502 to generate the selected insight 106, e.g., "http://MyReportServer?report=Profit-Analysis&product=T40X_Laptop." In one configuration, the insight materializing component 412 may include a standard web browser (not shown) or code capable of rendering HTML "pages." However, the invention should not be construed as being restricted to HTML-based or even browser-based implementations. In one embodiment, the parameterized URL 502 is sent to the insight generator 107, which generates and returns the appropriate insight 106.

Figure 6:
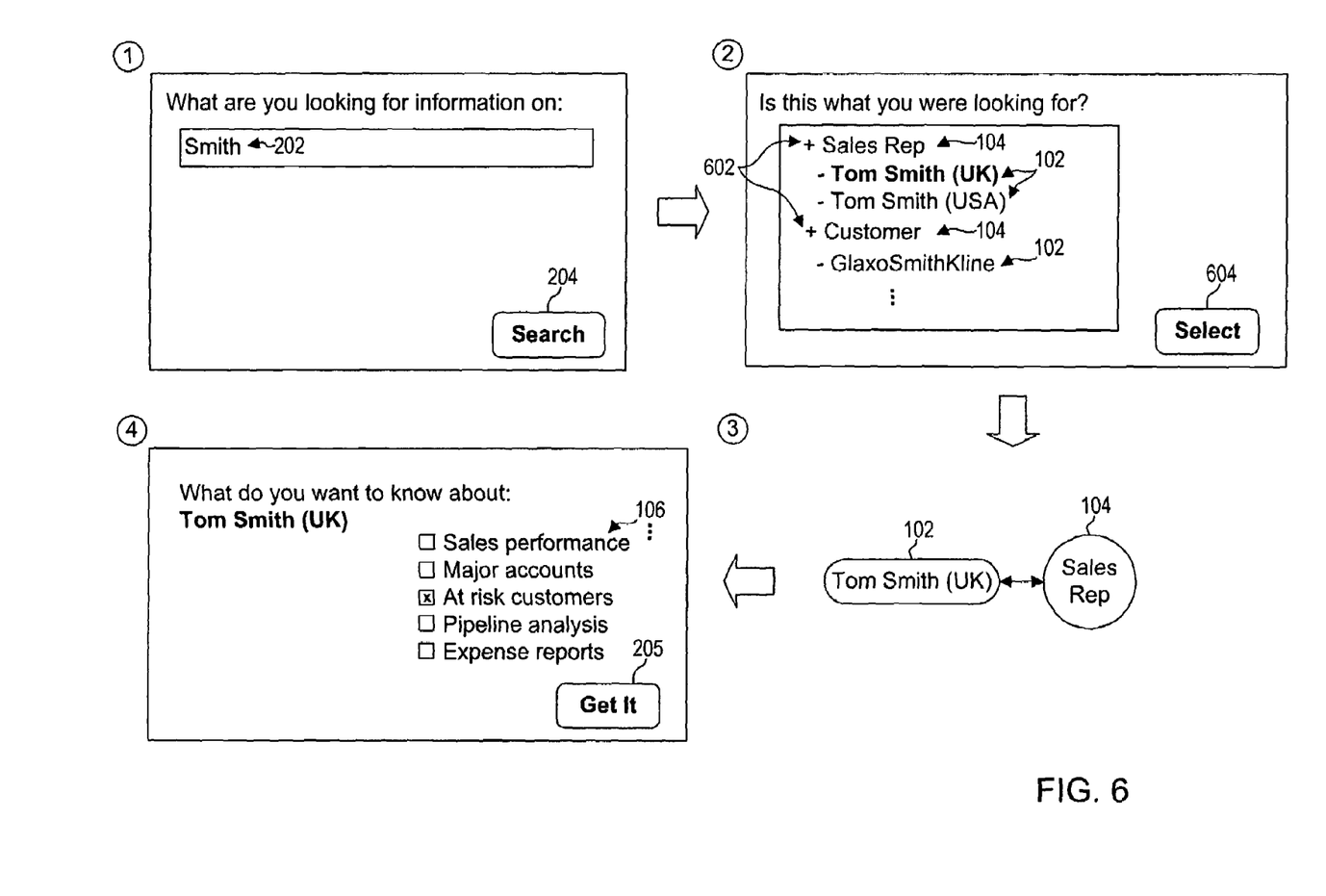
FIG. 6 is a third example of a user session with an insight discovery system.

FIG. 6 presents an alternative process for insight discovery according to an embodiment of the invention. In step 1, a user specifies a search item 202 as previously described. Unlike the examples of FIGS. 2 and 3, however, no item class 104 is selected.

In step 2, the IDS 108 presents the user a list of possibly matching items 102. Since the list may be long (because it is not being filtered by an item class 104), items 102 may be grouped according to item class 104, with an indication of the item class 104 being displayed for each group. For example, as shown in FIG. 6, the IDS 108 may list an item class 104, e.g., "Sales Rep," and a number of possibly-matching items 102, e.g., "Tom Smith (UK)," "Tom Smith (USA)," registered to that item class 104.

In one embodiment, the IDS 108 may initially present the user with a list of item classes 104, which the user may then expand (by activating an expansion control 602, for example) to reveal an associated list of items 102. The user may confirm his or her selection by activating a "Select" button 604 or the like.

In step 3, the IDS 108 identifies the item class 104 to which the selected item 102 is registered. This may done, in one embodiment, using registration data within the database 100, to enable the IDS 108 to be able to query the database 100 for insights 106 associated with that item class 104. The step of identifying the item class 104 may have already been performed at an earlier stage in the process. However, it is explicitly shown here because certain embodiments may not need to determine the item class 104 until this point.

In step 4, the IDS 108 queries the database 100 for and displays the insights 106 associated with the identified item class 104. Thereafter, as previously described in connection with FIG. 3, the user may select one or more of the insights 106 for materialization.

Figure 7:
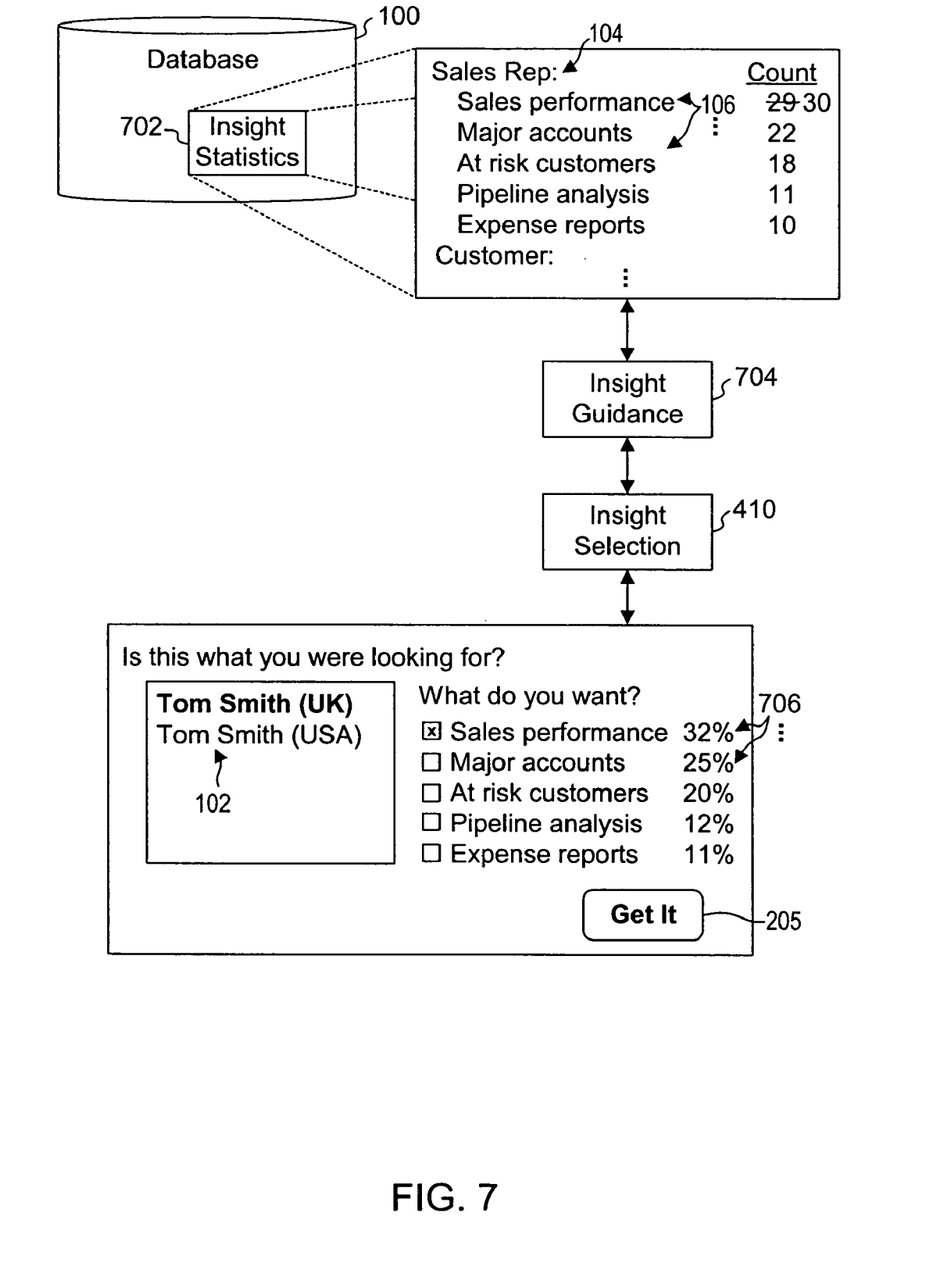
FIG. 7 is a data flow diagram showing the operation of an insight guidance component.

FIG. 7 illustrates an optional enhancement to the process of insight discovery. The above-described IDS 108 may present a user with dozens of potentially helpful insights 106, with no guidance as to which insight 106 is most useful. In one embodiment, the database 100 stores insight statistics 702 reflecting which insights 106 were historically selected by the user (and/or other users) with respect to a particular item class 104. For instance, as shown in FIG. 7, the insight statistics 702 may include a count of each time an insight 106 is selected for the "Sales Rep" item class 104. Many different types of statistics, however, may be stored within the scope of the invention.

In one implementation, the insight selection component 410 includes or is in communication with an insight guidance component 704, which is capable of accessing the insight statistics 702 in the database 100. As explained below, the insight guidance component 704 may guide a user's selection of an insight 106 in various ways.

For example, as shown in FIG. 7, the insight guidance component 704 may order the listing of insights 106 such that the most popular insight 106 is shown at the top of the list or in another location of prominence. Where the list is too long to be easily displayed, the insight guidance component 704 may only permit the display of the top five insights 106 (or other desired number) based on popularity.

In one embodiment, the insight guidance component 704 pre-selects the most popular insight 106, so that a user may display the insight by simply activating the "Get It" button 205. For instance, in the depicted embodiment, the "Sales performance" insight 106 is the most popular. Accordingly, the corresponding check box is pre-selected in the graphical user interface.

Alternatively, or in addition, the insight guidance component 704 may display a popularity indicator 706 next to one or more of the listed insights 106. The popularity indicator 706 may be numerical or symbolic or be represented in other ways. For example, as shown in FIG. 7, the popularity indicator 706 may represent a percentage of the total count of selected insights 106 for a particular item class 104.

The insight guidance component 704, in one embodiment, is responsible for updating the insight statistics 702 with each user selection. For instance, in response to the user selecting the "Sales performance" insight 106, the insight guidance component 704 updates the count for that insight 106 from 29 to 30.

The foregoing are only exemplary of many different ways in which the insight guidance component 704 may guide a user's selection of an insight 106. Additional types of guidance may be provided without departing from the spirit and scope of the invention.

Figure 8:
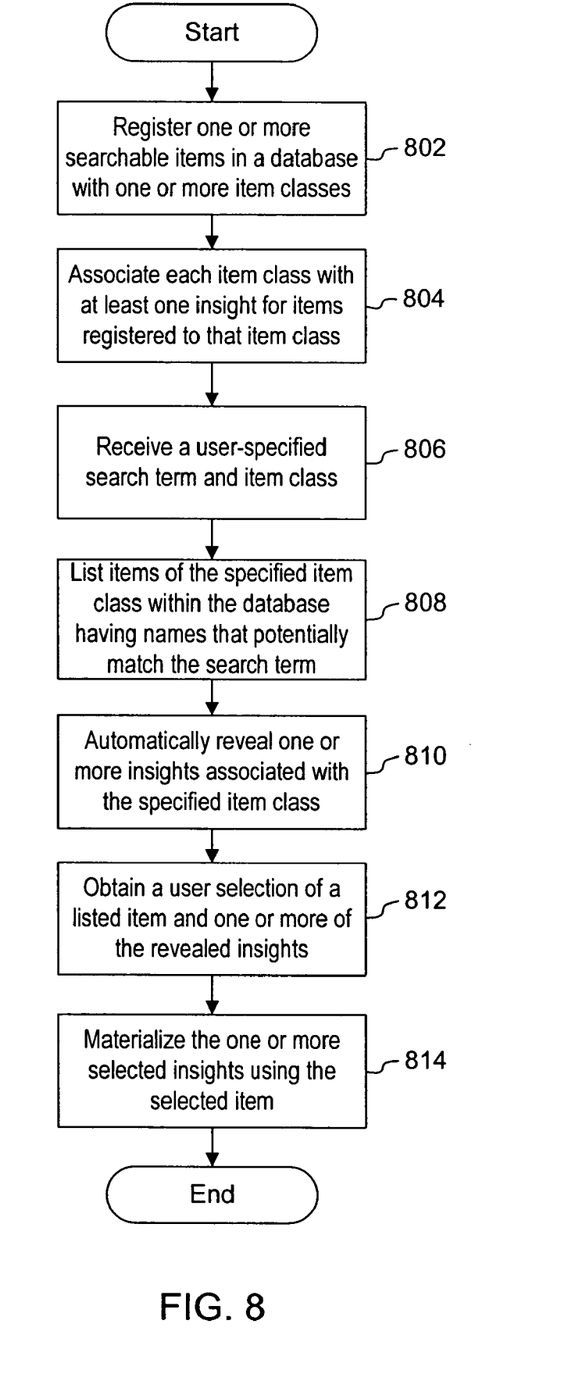
FIG. 8 is a flowchart of one embodiment of a method for automatic insight discovery.

Referring to FIG. 8, there is shown a flowchart of a method 800 for automatic insight discovery according to an embodiment of the invention. In one embodiment, a system registers 802 one or more searchable items in a database with one or more item classes. In addition, the system associates 804 each item class with at least one insight for items registered to that item class.

In response to receiving 806 a user-specified search term and item class, the system lists 808 items of the specified item class within the database having names that potentially match the search term. The system also automatically reveals one or more insights associated with the specified item class. In one embodiment, in response to obtaining 812 a user selection of a listed item and one or more of the revealed insights, the system materializes 814 the one or more selected insights using the selected item as a parameter.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

What is claimed is:

1. A computer-implemented method for generating and displaying insights, the method comprising:
    registering one or more searchable items in a database with one or more item classes, wherein each item class is associated with at least one insight pertaining to items registered to that item class, wherein the insight includes at least one from a set of: customized reports, views, and analyses;
    receiving a user-specified search term and a user-specified item class, wherein the item class is associated with one or more searchable items in the database, the searchable items having names that potentially match the search term;
    listing one or more items of the specified item class within the database having names that potentially match the search term;
    in response to receiving the item class, automatically revealing one or more insights associated with the specified item class;
    compiling statistics concerning which of the one or more insights were historically selected for the specified item class;
    guiding a user's insight selection by showing an indication of popularity for at least one displayed insight based on prior selections of insights associated with the specified item class;
    obtaining a user selection of a listed item and one or more of the revealed insights;
    materializing the one or more selected insights using the selected item by generating at least one of a parameterized view, a parameterized report, and a parameterized analysis using the selected item as a parameter; and
    displaying the one or more materialized insight associated with the specified item class.

2. The method of claim 1, further comprising allowing the user to select at least one different insight within a same screen in which the selected insight is materialized.

3. The method of claim 1, wherein generating comprises constructing a parameterized uniform resource locator (URL) comprising identifiers of the selected insight and the selected item.

4. The method of claim 1, wherein showing an indication of popularity comprises ordering a listing of two or more insights according to popularity.

5. The method of claim 1, wherein showing an indication of popularity comprises pre-selecting the most popular insight.

6. The method of claim 1, wherein showing an indication of popularity comprises showing a numerical or symbolic popularity indicator for at least one insight.

7. A computer-implemented method for generating and displaying insights, the method comprising:
    accessing a database comprising a plurality of searchable items, one or more of the items being registered with one or more item classes, each item class being associated with at least one insight pertaining to items registered to that item class, wherein the item class is associated with one or more searchable items in the database, the searchable items having names that potentially match the search term;
    receiving a user-specified search term;
    listing one or more items within the database having names that potentially match the search term;
    receiving a user selection of a listed item;
    identifying an item class associated with the selected item, wherein identifying comprises receiving a user selection of the item class;
    in response to identifying the item class, automatically revealing one or more insights associated with the identified item class, wherein the insight includes at least one from a set of: customized reports, views, and analyses;
    compiling statistics concerning which of the one or more insights were historically selected for the specified item class;
    guiding a user's insight selection by showing an indication of popularity for at least one displayed insight based on prior selections of insights associated with the specified item class;
    obtaining a user selection of one or more of the revealed insights;
    materializing the one or more selected insights using the selected item by generating at least one of a parameterized view, a parameterized report, and a parameterized analysis using the selected item as a parameter; and
    displaying the one or more materialized insight associated with the specified item class.

8. The method of claim 7, wherein listing comprises:
    grouping each of the listed items according to item class; and
    displaying an indication of an item class in conjunction with each corresponding group of items.

9. The method of claim 7, wherein showing an indication of popularity comprises ordering a listing of two or more insights according to popularity.

10. The method of claim 7, wherein showing an indication of popularity comprises pre-selecting the most popular insight.

11. The method of claim 7, wherein showing an indication of popularity comprises showing a numerical or symbolic popularity indicator for at least one insight.

12. A system for generating and displaying insights, the system comprising:
a processor that includes:
a database access component to provide access to a database comprising a plurality of searchable items, one or more of the items being registered with one or more item classes, each item class being associated with at least one insight pertaining to items registered to that item class, wherein the item class is associated with one or more searchable items in the database, the searchable items having names that potentially match the search term and wherein the insight includes at least one from a set of: customized reports, views, and analyses;
an item matching component to receive a user-specified search term and item class and to list one or more items of the specified item class within the database having names that potentially match the search term;
an insight guidance component to compile statistics concerning which of the one or more insights were selected for the specified item class and to guide a user's selection of an insight by showing an indication of popularity for at least one displayed insight based on prior selections of insights associated with the specified item class;
an insight selection component to automatically reveal one or more insights associated with the specified item class in response to the item matching component receiving the user-specified item class and to receive a user selection of a listed item and one or more of the revealed insights;
an insight materialization component to materialize the one or more selected insights using the selected item by generating at least one of a parameterized view, a parameterized report, and a parameterized analysis using the selected item as a parameter; and
a presentation component to display the one or more materialized insight associated with the specified item class.

13. The system of claim 12, wherein the insight materialization component is to allow the user to select at least one different insight within a same screen in which the selected insight is materialized.

14. The system of claim 12, wherein the insight materialization component is to construct a parameterized uniform resource locator (URL) comprising identifiers of the selected insight and the selected item.

15. The system of claim 12, wherein the insight guidance component is to show an indication of popularity by ordering a listing of two or more insights according to popularity.

16. The system of claim 12, wherein the insight guidance component is to show an indication of popularity by pre-selecting the most popular insight.

17. The system of claim 12, wherein the insight guidance component is to show an indication of popularity by showing a numerical or symbolic popularity indicator for at least one insight.

18. A system for generating and displaying insights, the system comprising:
a processor that includes:
a database access component to access a database comprising a plurality of searchable items, one or more of the items being registered with one or more item classes, each item class being associated with at least one insight pertaining to items registered to that item class, wherein the item class is associated with one or more searchable items in the database, the searchable items having names that potentially match the search term and wherein the insight includes at least one from a set of: customized reports, views, and analyses;
an item matching component to receive a user-specified search term and to list one or more items within the database having names that potentially match the search term;
an insight guidance component to compile statistics concerning which of the one or more insights were selected for the specified item class and to guide a user's selection of an insight by showing an indication of popularity for at least one displayed insight based on prior selections of insights associated with the specified item class;
an insight selection component to receive a user selection of a listed item, identify an item class associated with the selected item, automatically reveal one or more insights associated with the identified item class in response to identifying the item class, and receive a user selection of one or more of the revealed insights, wherein the insight selection component is configured to identify the item class by receiving a user selection of the item class;
an insight materialization component to materialize the one or more selected insights using the selected item by generating at least one of a parameterized view, a parameterized report, and a parameterized analysis using the selected item as a parameter; and
a presentation component to display the one or more materialized insight associated with the specified item class.

19. The system of claim 18, wherein the item matching component is to group each of the listed items according to item class and display an indication of an item class in conjunction with each corresponding group of items.

20. The system of claim 18, wherein the insight guidance component is to show an indication of popularity by ordering a listing of two or more insights according to popularity.

21. The system of claim 18, wherein the insight guidance component is to show an indication of popularity by preselecting the most popular insight.

22. The system of claim 18, wherein the insight guidance component is to show an indication of popularity by showing a numerical or symbolic popularity indicator for at least one insight.

23. A computer-readable medium having stored therein program instructions for generating and displaying insights, the instructions comprising:
registering one or more searchable items in a database with one or more item classes, wherein each item class is associated with at least one insight pertaining to items registered to that item class, wherein the insight includes at least one from a set of: customized reports, views, and analyses;
receiving a user-specified search term and item class, wherein the item class is associated with one or more searchable items in the database, the searchable items having names that potentially match the search term;
listing one or more items of the specified item class within the database having names that potentially match the search term;
automatically revealing one or more insights associated with the specified item class in response to receiving the item class;

compiling statistics concerning which of the one or more insights were historically selected for the specified item class;

guiding a user's insight selection by showing an indication of popularity for at least one displayed insight based on prior selections of insights associated with the specified item class;

obtaining a user selection of a listed item and one or more of the revealed insights;

materializing the one or more selected insights using the selected item by generating at least one of a parameterized view, a parameterized report, and a parameterized analysis using the selected item as a parameter; and displaying the one or more materialized insight associated with the specified item class.

24. The computer-readable medium of claim 23, the instructions further comprising allowing the user to select at least one different insight within a same screen in which the selected insight is materialized.

25. The computer-readable medium of claim 23, the instructions further comprising constructing a parameterized uniform resource locator (URL) comprising identifiers of the selected insight and the selected item.

26. The computer-readable medium of claim 23, the instructions further comprising guiding a user's insight selection comprise program instructions for ordering a listing of two or more insights according to popularity.

27. The computer-readable medium of claim 23, the instructions further comprising guiding a user's insight selection comprise program instructions for pre-selecting the most popular insight.

28. The computer-readable medium of claim 23, the instructions further comprising guiding a user's insight selection comprise program instructions for showing a numerical or symbolic popularity indicator for at least one insight.

29. A computer-readable medium having stored therein program instructions for generating and displaying insights, the program instructions comprising:

accessing a database comprising a plurality of searchable items, one or more of the items being registered with one or more item classes, each item class being associated with at least one insight pertaining to items registered to that item class;

receiving a user-specified search term, wherein the item class is associated with one or more searchable items in the database, the searchable items having names that potentially match the search term;

listing one or more items within the database having names that potentially match the search term;

receiving a user selection of a listed item;

identifying an item class associated with the selected item, wherein identifying comprises receiving a user selection of the item class;

automatically revealing one or more insights associated with the identified item class in response to identifying the item class, wherein the insights include at least one from a set of: customized reports, views, and analyses;

compiling statistics concerning which of the one or more insights were historically selected for the specified item class;

guiding a user's insight selection by showing an indication of popularity for at least one displayed insight based on prior selections of insights associated with the specified item class;

obtaining a user selection of one or more of the revealed insights;

materializing the one or more selected insights using the selected item by generating at least one of a parameterized view, a parameterized report, and a parameterized analysis using the selected item as a parameter; and displaying the one or more materialized insight associated with the specified item class.

30. The computer-readable medium of claim 29, wherein the program instructions further comprise:

grouping each of the listed items according to item class; and displaying an indication of an item class in conjunction with each corresponding group of items.

31. The computer-readable medium of claim 29, the instructions further comprising ordering a listing of two or more insights according to popularity.

32. The computer-readable medium of claim 29, the instructions further comprising pre-selecting the most popular insight.

33. The computer-readable medium of claim 29, the instructions further comprising showing a numerical or symbolic popularity indicator for at least one insight.

34. An apparatus for generating and displaying insights, the apparatus comprising:

means for accessing a database comprising a plurality of searchable items, one or more of the items being registered with one or more item classes, each item class being associated with at least one insight pertaining to items registered to that item class, wherein the item class is associated with one or more searchable items in the database, the searchable items having names that potentially match the search term;

means for receiving a user-specified search term;

means for listing one or more items within the database having names that potentially match the search term;

means for receiving a user selection of a listed item;

means for identifying an item class associated with the selected item, wherein identifying comprises receiving a user selection of the item class;

means for automatically revealing one or more insights associated with the identified item class, in response to identifying the item class, wherein the insight includes at least one from a set of: customized reports, views, and analyses;

means for compiling statistics concerning which of the one or more insights were historically selected for the specified item class;

means for guiding a user's insight selection by showing an indication of popularity for at least one displayed insight based on prior selections of insights associated with the specified item class;

means for obtaining a user selection of one or more of the revealed insights;

means for materializing the one or more selected insights using the selected item by generating at least one of a parameterized view, a parameterized report, and a parameterized analysis using the selected item as a parameter; and means for displaying the one or more materialized insight associated with the specified item class.

35. A computer-readable medium having stored therein code segments for generating and displaying insights, comprising:

a code segment for causing a computer to access a database comprising a plurality of searchable items, one or more of the items being registered with one or more item classes, each item class being associated with at least one insight pertaining to items registered to that item class;

a code segment for causing a computer to receive a user-specified search term, wherein the item class is associated with one or more searchable items in the database, the searchable items having names that potentially match the search term;

a code segment for causing a computer to list one or more items within the database having names that potentially match the search term;

a code segment for causing a computer to receive a user selection of a listed item;

a code segment for causing a computer to identify an item class associated with the selected item, wherein identifying comprises receiving a user selection of the item class;

a code segment for causing a computer to automatically reveal one or more insights associated with the identified item class in response to the computer identifying the item class, wherein the insights include at least one from a set of: customized reports, views, and analyses;

a code segment for compiling statistics concerning which of the one or more insights were historically selected for the specified item class;

a code segment for causing a computer to guide a user's insight selection by showing an indication of popularity for at least one displayed insight based on prior selections of insights associated with the specified item class;

a code segment for causing a computer to obtain a user selection of one or more of the revealed insights;

a code segment for causing a computer to materialize the one or more selected insights using the selected item by generating at least one of a parameterized view, a parameterized report, and a parameterized analysis using the selected item as a parameter; and a code segment for causing a computer to display the one or more materialized insight associated with the specified item class.

* * * * *